(12) United States Patent
Sung et al.

(10) Patent No.: US 7,536,037 B2
(45) Date of Patent: May 19, 2009

(54) APPARATUS AND METHOD FOR HUMAN DISTINCTION USING INFRARED LIGHT

(75) Inventors: Younghun Sung, Gyeonggi-do (KR); Euihyeon Hwang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 810 days.

(21) Appl. No.: 10/991,867

(22) Filed: Nov. 19, 2004

(65) Prior Publication Data

US 2005/0105778 A1    May 19, 2005

(30) Foreign Application Priority Data

Nov. 19, 2003   (KR) .................... 10-2003-0082333

(51) Int. Cl.
*G06K 9/00* (2006.01)
(52) U.S. Cl. .................. 382/118; 382/254; 250/339.11; 340/5.53
(58) Field of Classification Search ................ 382/118, 382/115, 117, 104, 125, 294, 276, 293, 151, 382/168, 173, 254, 260, 266; 250/504 R, 250/DIG. 1, 342, 338.1, 339.06, 339.11, 250/341.8; 348/77, 78, 164, 169, 342, 207.99, 348/E5.058; 340/5.53, 5.83, 545.3, 567, 340/575, 576, 573.1; 701/45, 47, 46; 600/558; 607/95, 93, 88, 92; 280/735; 385/902
See application file for complete search history.

(56) References Cited

U.S. PATENT DOCUMENTS

| | | | | |
|---|---|---|---|---|
| 5,861,940 A | * | 1/1999 | Robinson et al. | ............ 351/221 |
| 6,668,185 B2 | * | 12/2003 | Toida | .......................... 600/425 |
| 7,206,435 B2 | * | 4/2007 | Fujimura et al. | ............ 382/117 |
| 7,265,781 B2 | * | 9/2007 | Noguchi | .................. 348/223.1 |

FOREIGN PATENT DOCUMENTS

| | | |
|---|---|---|
| JP | 2004-146036 | 5/2004 |
| KR | 1998-064265 | 10/1998 |
| KR | 10-2001-0002220 | 1/2002 |
| KR | 10-2002-0081220 | 10/2002 |
| WO | WO 01/95247 | 12/2001 |

OTHER PUBLICATIONS

Jain, A. et al., "Biometrics: Personal Identification in Networked Society," 1999, Kluwer, Boston, pp. 193, 195.

* cited by examiner

*Primary Examiner*—Sheela C Chawan
(74) *Attorney, Agent, or Firm*—Staas & Halsey LLP

(57) ABSTRACT

An apparatus and method for human distinction using infrared light, the apparatus includes: a photographing unit, which photographs a subject by radiating or not radiating infrared light onto the subject according to a predetermined control signal; and an image processing unit, which outputs the predetermined control signal, receives images output from the photographing unit to detect a predetermined area in each of the images, compares an infrared image and a non-infrared image of the detected areas, and determines whether the subject is obtained from a real human face or not.

15 Claims, 5 Drawing Sheets

APPARATUS AND METHOD FOR HUMAN DISTINCTION USING INFRARED LIGHT

CROSS-REFERENCE TO RELATED APPLICATION

This application claims the priority of Korean Patent Application No. 2003-82333, filed on Nov. 19, 2003 in the Korean Intellectual Property Office, the disclosure of which is incorporated herein by reference.

BACKGROUND OF THE INVENTION

1. Field of the Invention

The present invention relates to an apparatus and method for human distinction using infrared light, and more particularly, to an apparatus and method of discriminating a human face using infrared light from a picture.

2. Description of the Related Art

A face recognition system is one of the most convenient technologies among biorecognition systems since a user only has to look at a camera without the need of inputting a password or a code. Such a system reduces input from the users since unlike fingerprint or iris recognition systems it does not require any physical contact.

Recently, face recognition technologies have come into commercial use in many countries, including the U.S. replacing other customer identification methods, for example, using passwords and fingerprints, which have been used in financial companies such as banks. Face recognition systems have various applications. For example, a face recognition system can be used as a password control system in an airport, seaport, etc., as an exit and entry system in an off-limits building, and to authenticate payers or users in electronic payment or commerce using an ultrahigh speed network.

However, a problem arising with the exit and entry system using the face recognition system lies in that an unauthorized person may attempt to pass the system using a photograph of an authorized person or a mannequin which looks like an authorized person. In particular, when an unauthorized person shows a photograph of an authorized person, the face recognition system may allow the unauthorized person to pass the system by mis-recognizing the unauthorized person as the authorized person based on a photograph image of the authorized person. This problem may frequently occur since it has become easier to obtain a certain person's picture with the development of the Internet and wide usage of digital cameras. Therefore, it is required to discriminate the face of a real person from a photograph of the person.

SUMMARY OF THE INVENTION

According to an aspect of the present invention, there is provided an apparatus and method for discriminating a real human face from a photograph by obtaining a face image of a person using infrared light and comparing the face image with a face image of the person obtained by a non-infrared light.

According to an aspect of the present invention, there is provided an apparatus for human distinction, including: a photographing unit, which photographs a subject by radiating or not radiating infrared light onto the subject according to a predetermined control signal; and an image processing unit, which outputs the predetermined control signal, receives images output from the photographing unit to detect a predetermined area in each of the images, compares an infrared image and a non-infrared image of the detected areas, and determines whether the subject is obtained from a real human face or not.

According to another aspect of the present invention, there is provided a method of human distinction including: obtaining a first image by photographing a subject; obtaining a second image by radiating infrared light onto the subject and photographing the subject; detecting predetermined areas from the first image and the second image; and comparing the two detected areas and determining whether a difference exists between the two detected areas to discriminate whether the subject is a real human face or not.

According to another aspect of the present invention, there is provided a method of human distinction including: radiating infrared light onto a subject and photographing the subject; performing visible light filtering and infrared light filtering on each photographed image to obtaining an infrared image including only infrared and a visible light image including only visible light; detecting predetermined areas in the infrared image and the visible light image; and determining whether a difference between the two detected areas exists to discriminate whether the subject is a real human face or not.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
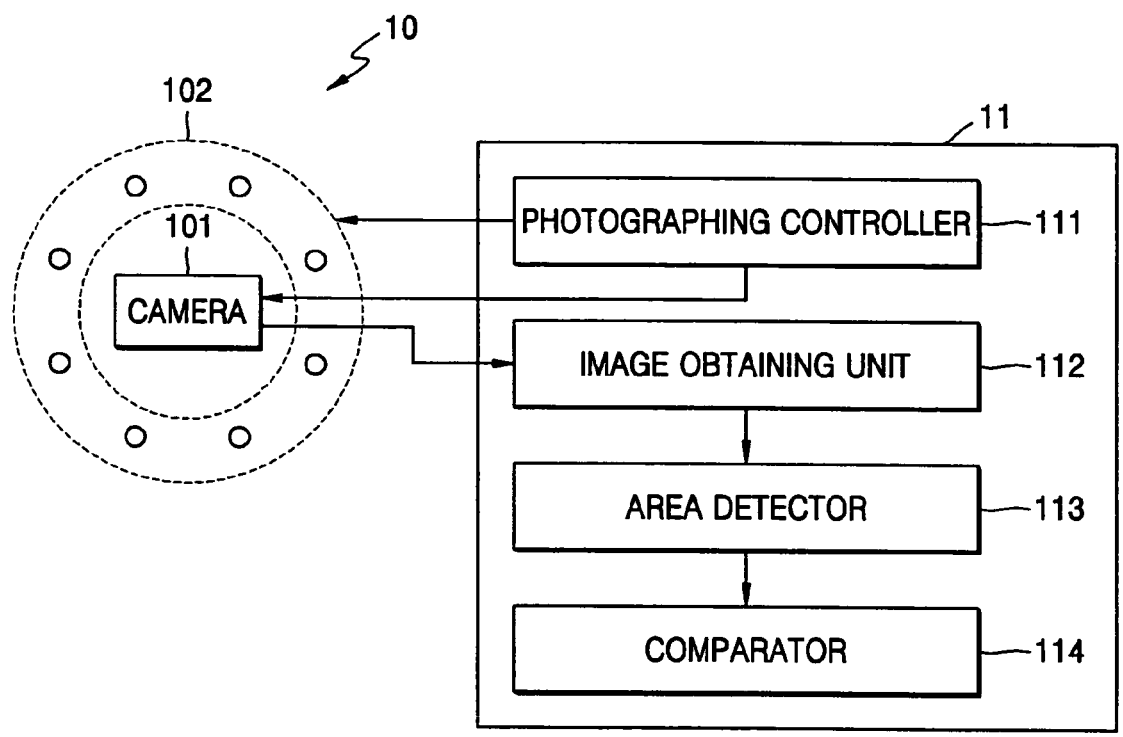
FIG. 1 is a block diagram of an apparatus for human distinction according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, an apparatus for human distinction according to an embodiment of the present invention includes a photographing unit 10 and an image processing unit 11. The photographing unit 10 includes a camera 101 and an infrared generator 102. The image processing unit 11 includes a photographing controller 111, an image obtaining unit 112, an area detector 113, and a comparator 114.

It is preferable, but not necessary, that the camera 101 can digitally process an obtained image by a charge coupled device (CCD) or CMOS image sensor (CIS). The infrared generator 102 may be positioned around the camera 101. The infrared generator 102 generates infrared light and radiates the infrared light onto a subject according to a control signal output from the photographing controller 111. The infrared generator 102 includes a plurality of infrared light emitting diodes (LEDs), which are arranged properly spaced around the camera 101.

The photographing controller 111 adjusts an infrared generating time and outputs a suitable control signal. The control signal generating infrared light has to be synchronized with a signal driving the camera 101. For example, to obtain an infrared image, the photograph controller 111 generates a control signal so that the infrared generator 102 and the camera 101 are substantially simultaneously operated in synchronization with each other when a subject to be photographed appears in front of the camera 101.

The image obtaining unit 112 obtains a photographed image from the camera 101, and the area detector 113 detects an eye area from the photographed image. The reason for detecting the eye area is that the eyes have a greater difference of diffraction rate between infrared light and non-infrared light than other areas. In other words, an iris area and a pupil area in human eyes have a great infrared reflection rate difference. Any existing eye area detecting algorithm can be used for eye area detection in the present invention.

The image obtaining unit 112 may further include a visible light filter (not shown) and an infrared filter (not shown). Filtering is carried out using the image obtained from the camera 101. In this case, the image obtained from the camera 101 is an image including infrared light. An image that has passed through the visible light filter includes only infrared light, and an image that has passed through the infrared filter includes only visible light.

The area detector 113 may further include a highlighting detector (not shown). Highlighting detection may be advantageous in discriminating a picture from others. In other words, areas beside the eye area in a human face are not influenced by infrared light. In contrast, materials having slick surfaces such as photographic paper, framed pictures, or magazines have conspicuously high infrared reflection rates. Thus, when highlighting is detected, the subject is determined to be a picture, not to be a person's face, without an image comparison by the comparator 114.

The highlighting detector may detect highlighting by using histograms. In particular, the luminance of each pixel of the obtained image is investigated. With the assumption that the obtained image has an 8-bit resolution, if the number of pixels having high luminance levels above a certain value, for example a 230-level, is larger than the number of pixels having other luminance levels, the subject is determined to be a picture, not a human's face.

The comparator 114 compares an image including infrared light with an image including only visible light to determine whether the images are obtained from a real face or a photograph based on the degree of reflection of the infrared in the eye area.

For example, an iris area of a human eye becomes brighter while a pupil area becomes darker in the case of being exposed to infrared light than not exposed to infrared light. However, the eye area in a picture does not show any change regardless of being exposed to infrared light or not. The degree of change is expressed as the following equation.

$$diff = \frac{A \cdot B}{\|A\| * \|B\|} \quad (1)$$

where A and B are pixel vectors of the eye area of the image exposed to infrared light and the image not exposed to infrared light, respectively.

According to equation 1, if the diff value is nearer to 1, the degree of change is smaller. The range of diff values used to determine whether an image is obtained from a real human face or a picture can be experimentally set.

Figure 2:
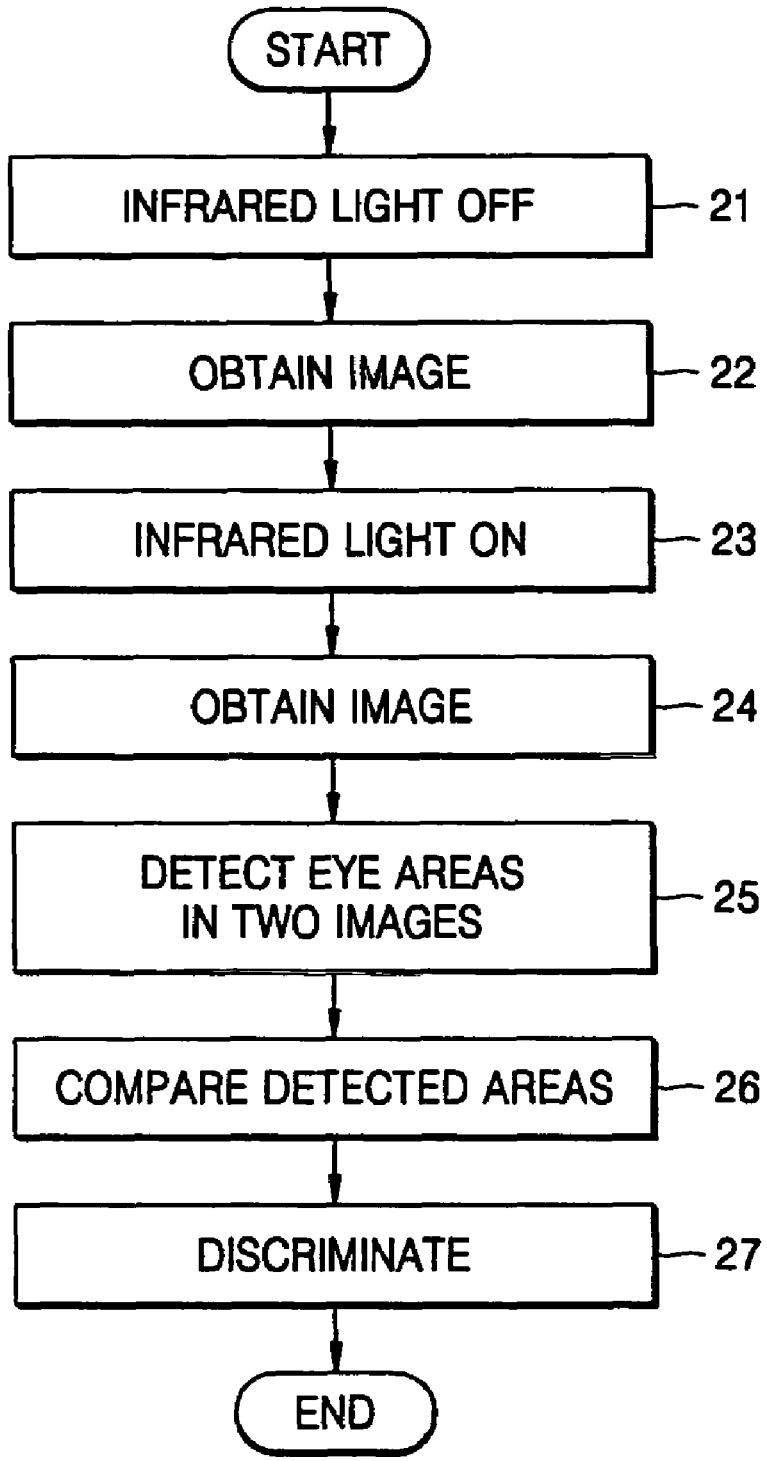
FIG. 2 is a flowchart of a method of human distinction according to an embodiment of the present invention.

FIG. 2 is a flowchart illustrating a method of human distinction according to an embodiment of the present invention. Referring to FIG. 2, in operation 21, the photographing controller 111 drives the camera 101 to shoot when the infrared generator 102 is off. In operation 22, the image obtaining unit 112 obtains the image output from the camera 101. In operation 23, the photographing controller 111 substantially simultaneously drives the infrared light generator 102 and the camera 101 to shoot when the infrared generator 102 is on. In operation 24, the image obtaining unit 112 obtains the image output from the camera 101. In operation 25, the area detector 113 detects eye areas from the two images. The detection of the eye area can be carried out on both of the images or can be carried out on only one image. In the latter case, the eye area of the other image is detected based on the position of the eye area detected in the first image because there is a time difference of merely 1-2 frames between the two images, with the assumption that the person almost did not move during the short time period.

A process of detecting highlighting may be additionally carried out using the image including infrared light. When highlighting is detected, the image is determined not to be an image of a real human face and the discrimination process is terminated.

When no highlighting is detected or when the process of detecting highlighting is not performed, the detected eye areas are compared (operation 26), and it is determined whether the images are from a real human face or a picture (operation 27).

Figure 3:
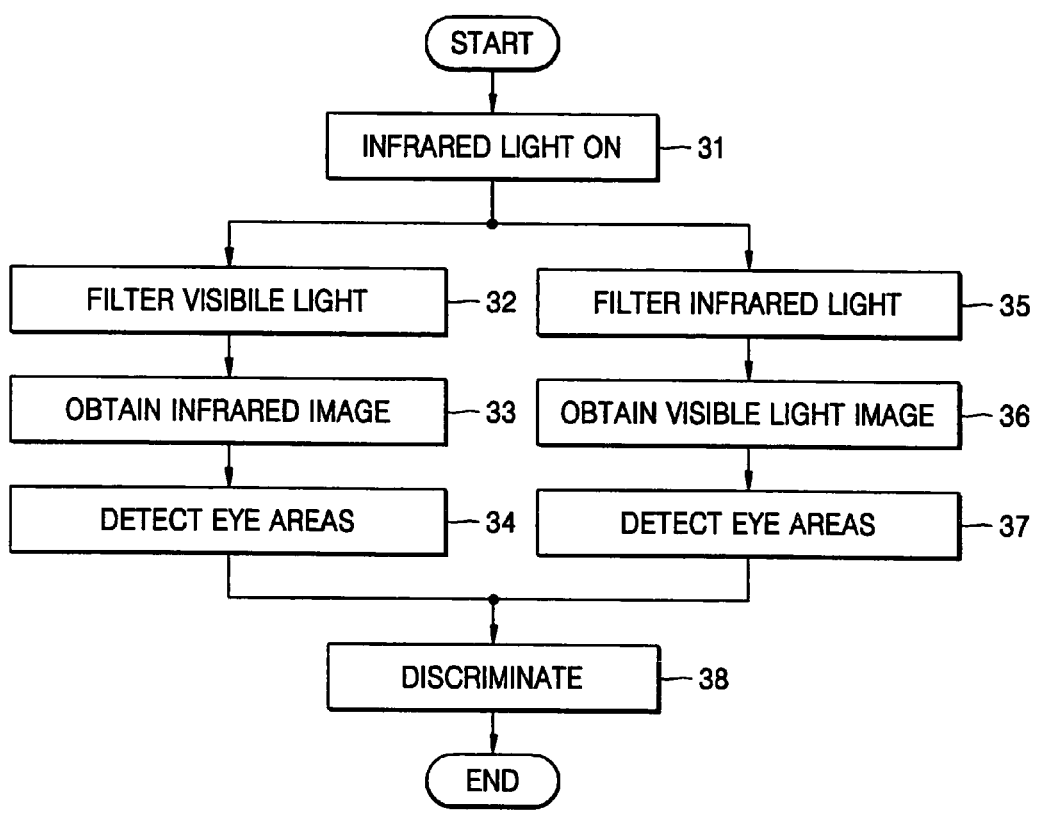
FIG. 3 is a flowchart of a method of human distinction according to another embodiment of the present invention.

FIG. 3 is a flowchart illustrating a method for human distinction according to another embodiment of the present invention. The photographing controller 111 substantially simultaneously drives the infrared generator 102 and the camera 101. The image obtaining unit 112 performs visible light filtering (operation 32) or infra red light filtering (operation 35) on images output from the camera 101 and obtains an infrared image (operation 33) or a visible light image (operation 36). Eye areas of the eyes are detected from the obtained infrared image (operation 34) and visible light image (operation 37). As in the case of FIG. 2, the detection of eye areas can be performed on both of the images or only one of the images. In the latter case, the position of the eye area detected in one of the images can be transferred and used as the eye area of the other image.

A process of detecting highlighting in the infrared image can be additionally performed. If highlighting is detected in the infrared image, the image is determined not to be obtained from a real human face, and the human distinction process is terminated.

If highlighting is not detected in the infrared image or if the highlighting detecting process is not performed, the detected eye areas are compared to determine whether the image is obtained from a real human face or a picture (operation 38).

Figure 4A:
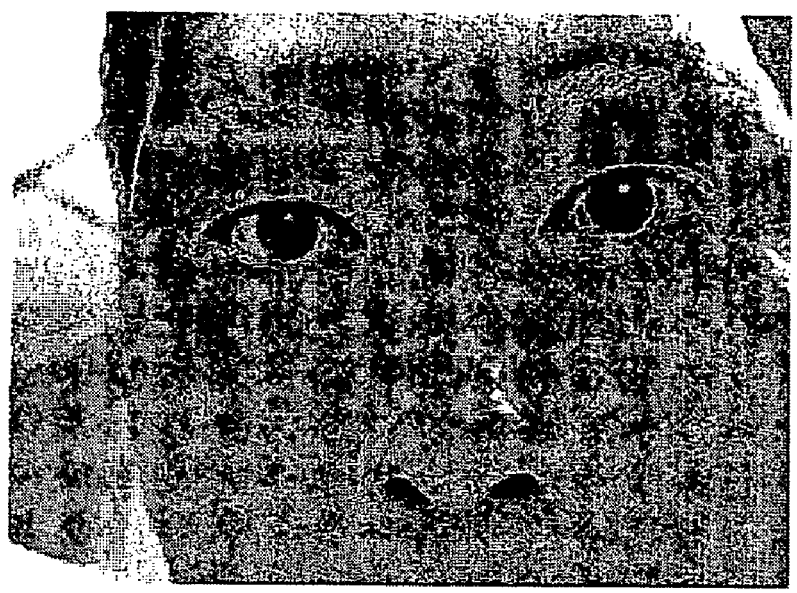
FIGS. 4A and 4B show images of a real person's face respectively obtained by not radiating and radiating infrared light.
Figure 4B:
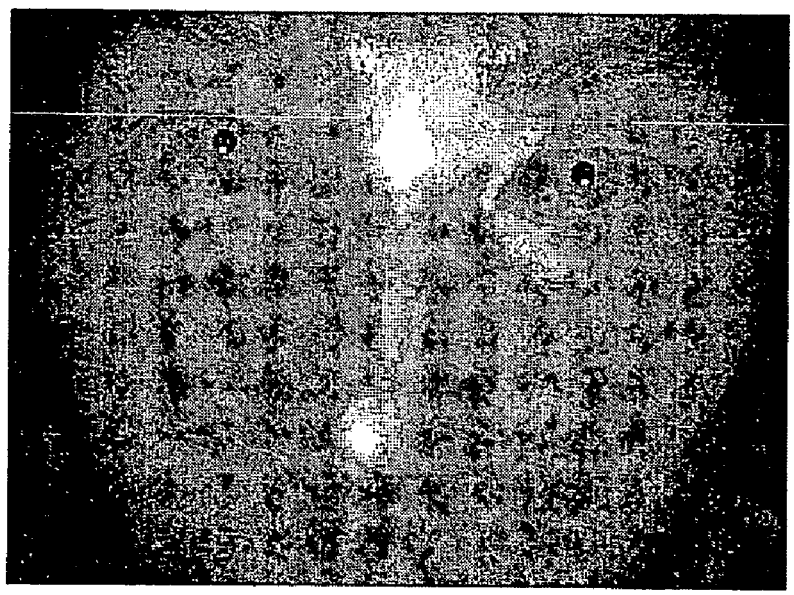

FIGS. 4A and 4B show facial images respectively obtained by not radiating and radiating infrared light onto a human face. When comparing the two images it can be determined that there is an obvious difference in the brightness of irises and pupils in the eye areas. That is, when the infrared light is radiated, the infrared reflection rate is higher in the irises than in the pupils.

Figure 5A:
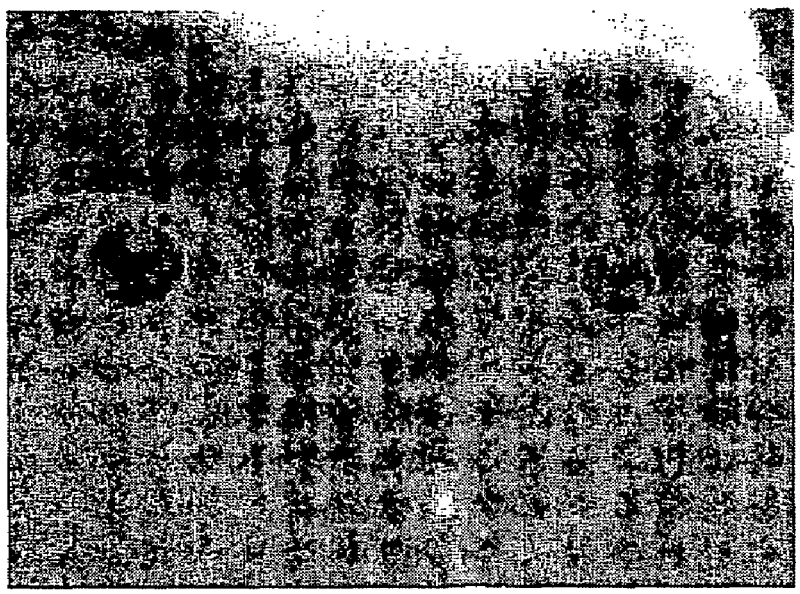
FIGS. 5A and 5B show images of a photographed person's face respectively obtained by not radiating and radiating infrared light.
Figure 5B:
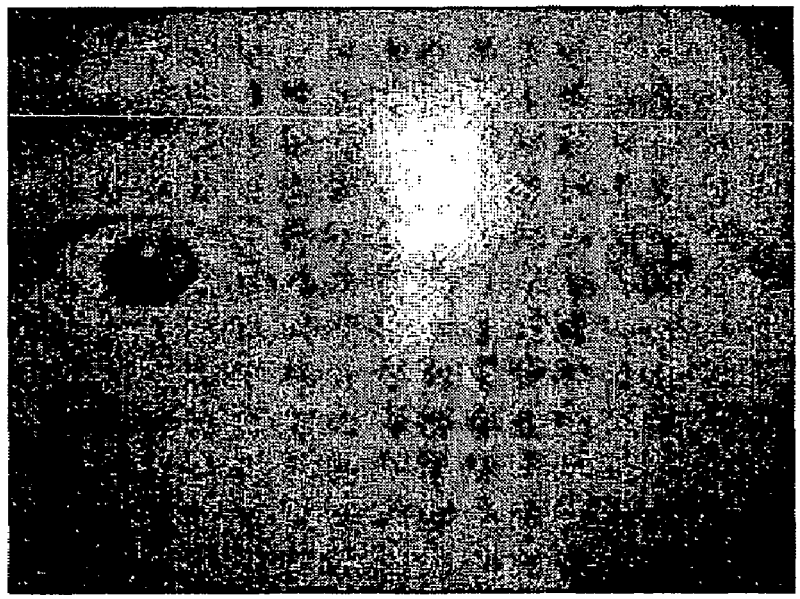

FIGS. 5A and 5B show facial images respectively obtained by not radiating and radiating infrared light onto a picture. When comparing the two images, it can be determined that there is no substantial brightness difference between the two images.

According to an embodiment of the present invention, an unauthorized person can be prevented from entering or exiting and entrance system, which is operated based on face recognition, using a picture of an authorized person. In addition, a face recognition-based, high-security system can be established using the present invention in which a real human face and a picture can be discriminated. Experimental results obtained by applying the present invention show a high accuracy in human distinction with a 99% photo detection ratio and a 5% false detection ratio. In the present invention, a human face can be identified in only 2-3 ms.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for human distinction, comprising:
    a photographing unit, which photographs a subject without radiating infrared light and which photographs the subject by radiating the infrared light onto the subject according to a predetermined control signal and outputs images of the subject; and
    an image processing unit, which outputs the predetermined control signal, receives the images output from the photographing unit to detect a predetermined area in each of the output images, compares an infrared image and a non-infrared image of the detected predetermined areas, and determines whether the subject is a real human face.

2. The apparatus of claim 1, wherein the photographing unit comprises:
    an infrared generator, which generates the infrared light according to the predetermined control signal and radiates the infrared light onto the subject; and
    a camera, which is operated according to the predetermined control signal to photograph the subject.

3. The apparatus of claim 2, wherein the image processing unit outputs the predetermined control signal to drive the camera and the infrared generator substantially simultaneously to photograph the subject.

4. The apparatus of claim 3, wherein the image processing unit comprises:
    a photographing controller, which outputs the predetermined control signal to the photographing unit;
    an image obtaining unit, which obtains the infrared image and the non-infrared image from the images photographed by the camera;
    an area detector, which detects the predetermined area from each of the images obtained in the image obtaining unit; and
    a comparator, which determines whether there is a difference between the detected predetermined areas to discriminate whether the subject is the real human face.

5. The apparatus of claim 4, further comprising a highlighting detector, which is connected to the area detector, detecting whether highlighting exists in the detected predetermined area of the infrared image, and determines that the subject is not the real human face if highlighting is detected.

6. The apparatus of claim 2, wherein the image processing unit substantially simultaneously drives the infrared generator and the camera and outputs the predetermined control signal used to photograph the subject.

7. The apparatus of claim 1, wherein the predetermined areas in each of the output images are eye areas of the subject.

8. The apparatus of claim 4, wherein the comparator compares the images including infrared light with the images including only visible light to determine whether the images are obtained from the real human face or a photograph based on a degree of reflection.

9. A method of human distinction comprising:
    obtaining a first image by photographing a subject;
    obtaining a second image by radiating infrared light onto the subject and photographing the subject;
    detecting predetermined areas of the first image and the second image; and
    comparing the detected predetermined areas from the first and second images and determining whether a difference exists between the detected predetermined areas to discriminate whether the subject is a real human face,
    wherein the method is performed using a controller.

10. The method of claim 9, wherein the comparing of the detected predetermined areas is performed by determining the difference between the detected predetermined areas according to a value obtained using the following equation:

$$diff = \frac{A \cdot B}{\|A\| * \|B\|}$$

where A denotes a pixel vector of the detected predetermined area of an infrared image and B denotes a pixel vector of the detected predetermined area of a non-infrared image.

11. The method of claim 9, wherein the detecting of the predetermined areas further comprises:
    detecting highlighting in the detected predetermined areas of the infrared image; and
    determining the subject not to be the real human face if highlighting is detected in the infrared image.

12. The method of claim 11, wherein the detecting of highlighting is performed using a histogram of luminance values of pixels of the detected predetermined areas.

13. An apparatus detecting an object comprising:
    a photographing unit photographing the object and photographing the object by radiating infrared light onto the object according to a predetermined control signal and outputting images of the object; and
    an image processing unit outputting the predetermined control signal, receiving the output images of the object, detecting predetermined areas in the output images of the object, comparing the predetermined areas of an infrared image and a non-infrared image, and determining whether the object is a real object based on the comparison.

14. The apparatus of claim 13, wherein the image processing unit comprises:
    a photographing controller outputting the predetermined control signal to the photographing unit;
    an image obtaining unit obtaining the infrared image and the non-infrared image;
    an area detector detecting the predetermined areas of the output images of the object; and
    a comparator comparing differences between the detected predetermined areas of the output images and determining whether the object is a real object based on the compared differences.

15. The apparatus of claim 13, wherein the predetermined areas are eye areas of the object.

* * * * *

UNITED STATES PATENT AND TRADEMARK OFFICE
CERTIFICATE OF CORRECTION

| | | |
|---|---|---|
| PATENT NO. | : 7,536,037 B2 | Page 1 of 1 |
| APPLICATION NO. | : 10/991867 | |
| DATED | : May 19, 2009 | |
| INVENTOR(S) | : Younghun Sung et al. | |

It is certified that error appears in the above-identified patent and that said Letters Patent is hereby corrected as shown below:

Column 6, Line 7, change "reflection." to --reflection of the infrared on an eye area.--.

Signed and Sealed this

Twenty-ninth Day of September, 2009

David J. Kappos
*Director of the United States Patent and Trademark Office*